United States Patent
Wagner et al.

(10) Patent No.: US 7,618,210 B2
(45) Date of Patent: Nov. 17, 2009

(54) PIPE AND TUBING CONNECTOR

(75) Inventors: Robert Wagner, Milwaukee, WI (US);
Alan Nash, Franklin, WI (US)

(73) Assignee: R & B Wagner, Inc., Butler, WI (US)

( * ) Notice: Subject to any disclaimer, the term of this patent is extended or adjusted under 35 U.S.C. 154(b) by 0 days.

(21) Appl. No.: 11/365,958

(22) Filed: Mar. 1, 2006

(65) Prior Publication Data

US 2007/0206989 A1    Sep. 6, 2007

(51) Int. Cl.
*B65G 21/20*   (2006.01)

(52) U.S. Cl. .................................. 403/306; 403/397

(58) Field of Classification Search .................. 403/294, 403/297, 303, 306, 397
See application file for complete search history.

(56) References Cited

U.S. PATENT DOCUMENTS

| | | | | |
|---|---|---|---|---|
| 3,484,830 A | | 12/1969 | Wagner et al. | |
| 3,547,475 A | * | 12/1970 | Gingher | 403/297 |
| 4,236,846 A | * | 12/1980 | Barton | 403/298 |
| 4,249,830 A | * | 2/1981 | Day | 403/297 |
| 5,275,074 A | * | 1/1994 | Taylor et al. | 403/297 |

* cited by examiner

*Primary Examiner*—Victor MacArthur
(74) *Attorney, Agent, or Firm*—Nicholas A. Kees; Godfrey & Kahn, S.C.

(57) ABSTRACT

A connector for pipe or tubing. The connector includes a unitary expansion member, formed from a body, a first expansion leg extending from the body, an optional second expansion leg extending from the body, and at least one opening extending through the body. In use, the connector is fastened in place by a fastener that is inserted through the at least one opening to contact at least one of the first and second expansion legs and force at least one of them to deform and contact the inside of the pipe or tubing, thereby securing the connector within the pipe or tubing.

3 Claims, 8 Drawing Sheets

PIPE AND TUBING CONNECTOR

BACKGROUND OF THE INVENTION

The present invention relates generally to connectors, and more particularly to a one-piece splice connector for use with pipe and tubing.

Pipe and tubing connectors are well known in the art. One such connector, sold under the trademark SPLICE LOCK™ by R&B Wagner, Inc. of Milwaukee, Wis., that is particularly well suited for use in the alignment of handrail pipe and tubing sections and as expansion joints is disclosed in U.S. Pat. No. 3,484,830. An example of such a connector is also shown in FIGS. 1-3, and includes a pair of separate channel sections 12, 14 and at least one set screw 41. First channel section 12 includes side wall flanges 16, a pair of slots 22, and a threaded aperture 24. Second channel section 14 includes side wall flanges 26 and a pair of prongs 32. The side wall flanges 16, 26 are formed for mating engagement with one another, and prongs 32 extend into slots 22 when the connector is assembled. One or more screws 41 are used to secure the connector with respect to the pipe or tubing being connected. As shown in FIGS. 2 and 3, the assembled connector is inserted into the ends of two abutting pipes or tubes 34, 35. The screw or screws 41 are then inserted through a hole or holes 40 in the pipes or tubes 34, 35, and threaded into the aperture(s) 24 in upper channel section 12 to expand the connector 10 to secure it within the pipes or tubes 34, 35.

Although the prior art connector 10 works well as a connector or expansion joint, it also has drawbacks. Most significantly, the two-piece design causes difficulties. The two channel pieces 12, 14 are not secured together until at least one set screw is put in place, and thus there is potential for the two pieces to separate inside the pipe before they are secured in place, which can make accurate installation difficult. In addition, it is more costly to manufacture two separate pieces. Two separate designs must be used, and the pieces must be designed to engage one another.

Given the limitations and problems with the existing connectors, there exists a need for an improved connector and expansion joint to be used to align two pieces of pipe or tubing. The present invention relates to improvements over the devices and methods described above, and to solutions to the problems raised or not solved thereby.

SUMMARY OF THE INVENTION

The present invention provides a connector for pipe and tubing that is particularly though not exclusively useful for aligning handrail sections. The connector includes a unitary expansion member and at least one fastener. The unitary expansion member has a body, a first expansion leg extending from the body, a second expansion leg extending from the body, and at least one opening extending through the body. The fastener is disposed through the at least one opening to expand the first and second expansion legs.

The body preferably is substantially flat or planar. A first leg portion extends transverse to the body portion, and then bends to extend over the body portion. After another bend, the leg extends away from the body. The at least one fastener can have a tapered end that engages the first and second expansion legs and causes them to flex outward, contacting the inside of the pipe or tubing into which the connector has been inserted.

The present invention also contemplates a method for aligning handrail sections. The method includes the step of providing a connector according to the present invention, a first handrail member having an open end and at least one aperture in a lower surface thereof for receiving the fastener, and a second handrail member having an open end. The method further includes the steps of inserting the unitary expansion member partially into the open end of the first handrail member such that the aperture in the first handrail member is aligned with the opening of the expansion member, placing the fastener through the aperture in the first handrail member, disposing the fastener partially into the opening of the expansion member, aligning the open end of the second handrail member with the open end of the first handrail member, and disposing the fastener further into the opening such that the fastener causes the expansion legs to expand, securing the connector within the handrail sections, and thereby securing the first and second handrail sections together.

The present invention has several advantages over the existing pipe and tubing connectors. Most significantly, the present invention provides a unitary expansion member that is less expensive to manufacture and easier to install than the prior art two-piece expansion members. Various other features, objects, and advantages of the invention will be made apparent to those skilled in the art from the accompanying drawings and detailed description thereof.

DETAILED DESCRIPTION OF THE INVENTION

Figure 1:
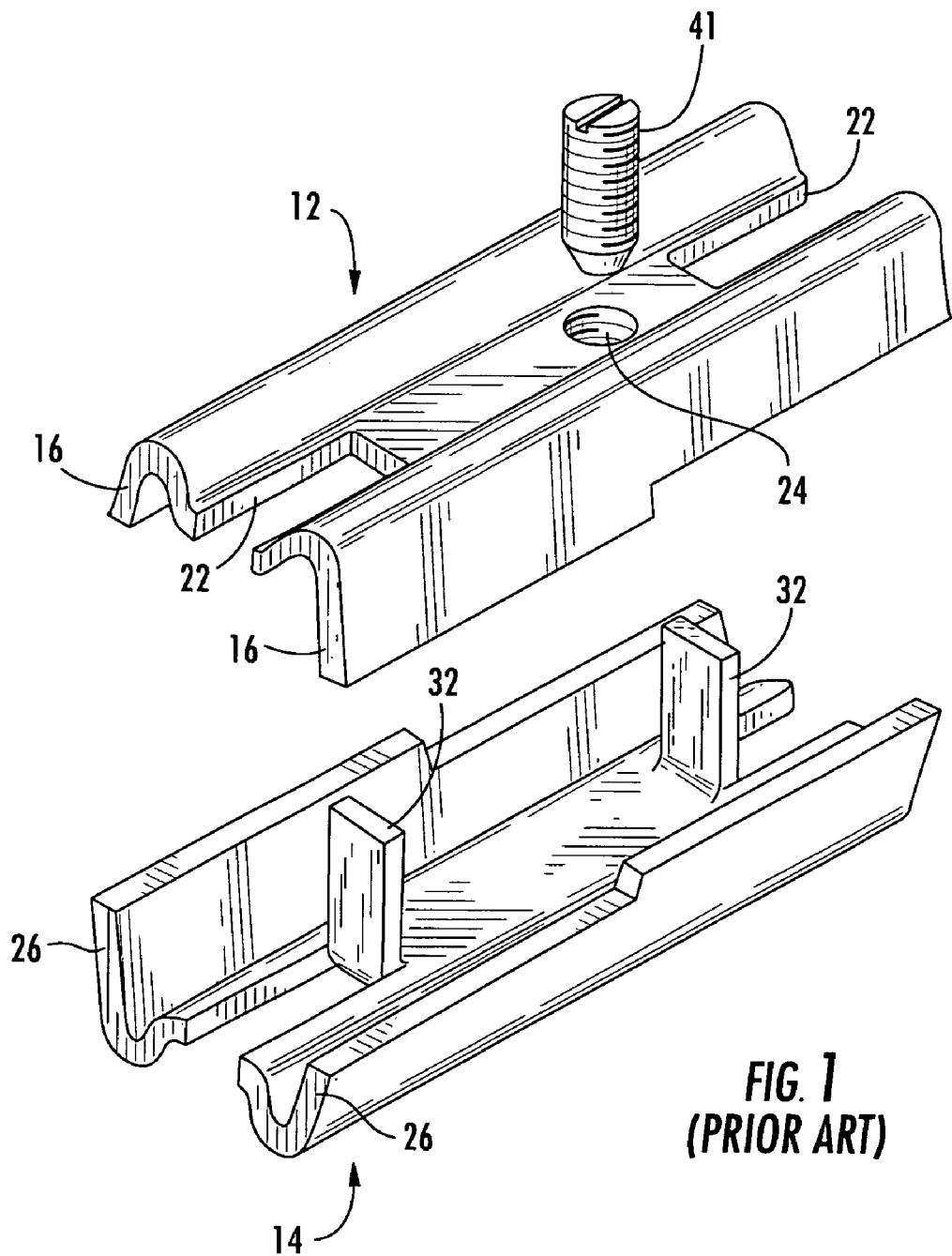
FIG. 1 is an exploded perspective view of a prior art connector used in the alignment of handrail pipe or tubing.
Figure 2:
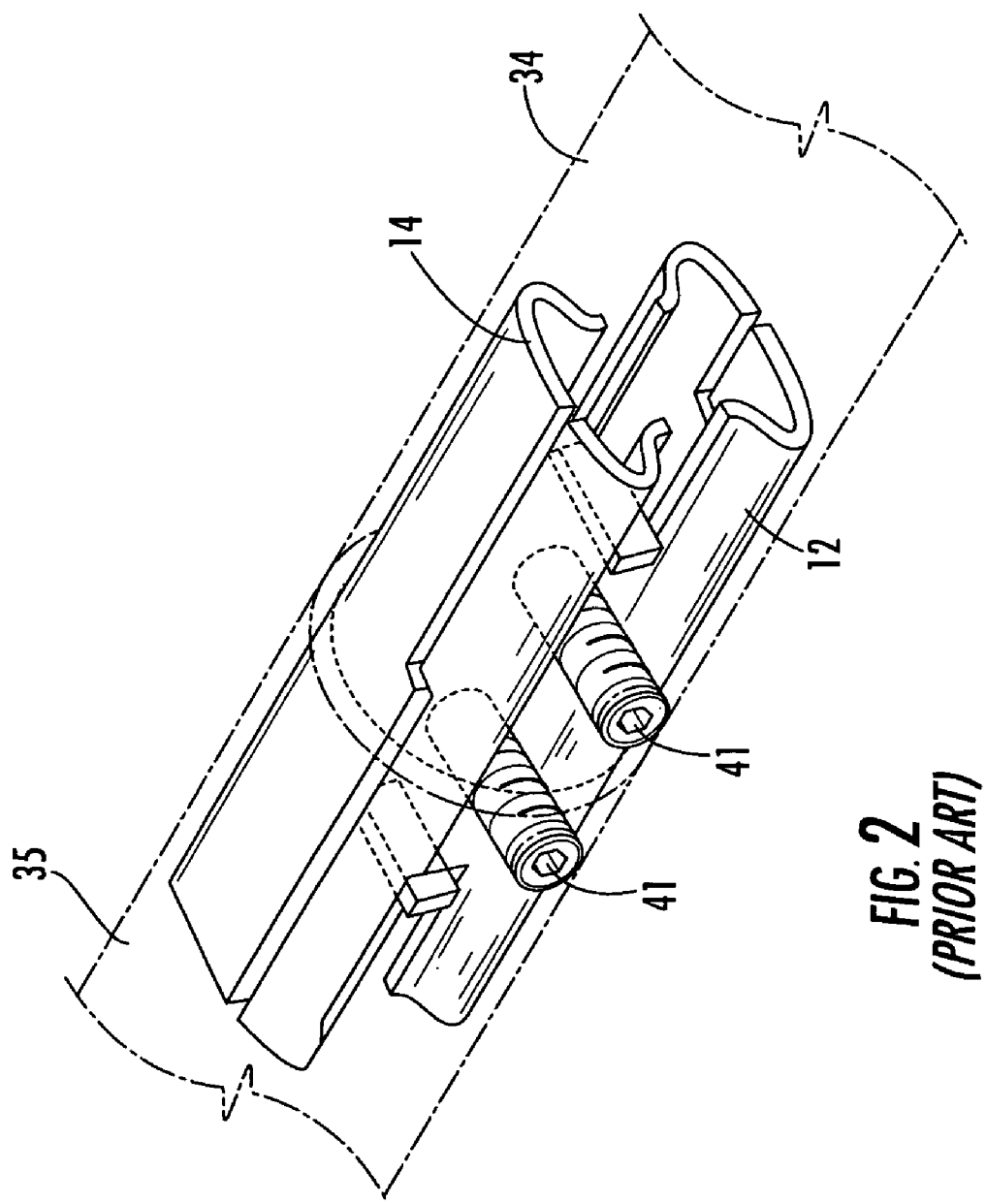
FIG. 2 is a perspective view of a prior art connector used in the alignment of handrail pipe or tubing, shown installed in two abutting pieces of pipe or tubing with the pipe or tubing shown in phantom.
Figure 3:
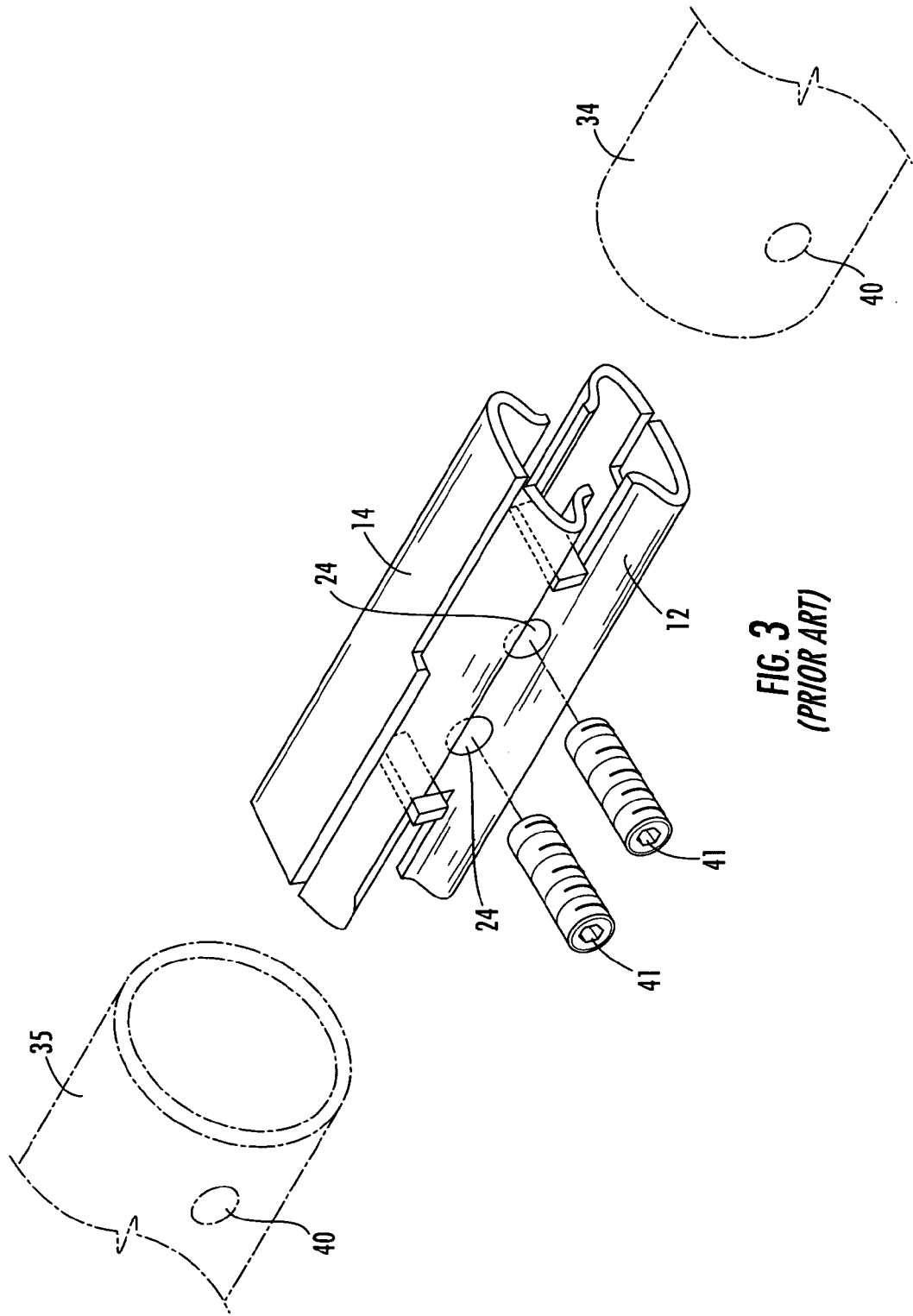
FIG. 3 is a partially exploded perspective view of the prior art connector of FIG. 2.

The present invention provides a connector for pipe or tubing that can be used for example to connect handrail sections and keep the connected sections in secure alignment. Referring now to FIGS. 4-8, the connector of the present invention includes a unitary expansion member 50 and is to be used with at least one fastener 52.

As shown in FIGS. 4-8, the unitary expansion member 50 is an extrusion, the length of which is determined at the time the member is put into use. In terms of cross section, as shown best in FIG. 6, member 50 has a body 58, a first expansion leg 60 and a second expansion leg 62. The body 58 is a generally flat member, oriented in a predetermined plane. The body 58 includes a thickened or boss portion 64, the purpose of which will be explained below. First expansion leg 60 includes a thigh portion 66 extending in a direction transverse to the plane of the body 58. First expansion leg 60 then has a bent or knee portion 70a, where it bends toward second expansion leg 62 and thereby begins to extend over the body 58, in a shin portion 71a, that generally overhangs the body. Before the shin portion 71a reaches as far as the center of the body 58, the first expansion leg 60 reaches another bend or heel 73a, where the leg bends in a direction away from the body 58, terminating in a foot 75a. Similarly, second expansion leg 62 includes a thigh portion 68 extending in a direction transverse to the plane of the body 58. Second expansion leg 62 then has a bent or knee portion 70b, where it bends toward first expansion leg 60 and thereby begins to extend over the body 58, in a shin portion 71b, that generally overhangs the body. Before the shin portion 71b reaches as far as the center of the body 58, second expansion leg 62 reaches another bend or heel 73b, where the leg bends in a direction away from the body 58, terminating in a foot 75b.

While other geometries may be used, in the embodiment shown in the drawing figures, the thigh portions 66 and 68 extend substantially perpendicular to the body 58. That is, in the embodiment shown, the body 58, first and second thigh portions 66, 68 and shin portions 71a, 71b form a substantially rectangular cross-section. Other cross-sectional geometries, however, could also be used. As shown best in FIG. 6, foot 75a is disposed at an angle 84a from shin portion 71a and foot 75b is disposed at an angle 84b from shin portion 71b. As well, an angle 86 is defined between foot 75a and foot 75b. Any angles 84a, 84b and 86, can be used that will facilitate the proper expansion of the expansion legs 60, 62 as described below, but in the preferred embodiment each of the angles is an acute angle. Boss portion 64 also includes at least one opening 78 to receive the at least one fastener 52. The openings 78 are preferably threaded to receive a threaded fastener 52 as described below. The embodiment shown in FIGS. 4-8 includes three openings 78, although any number of openings could be used, including a single opening 78.

Fastener 52 includes a first end 72, a second end 74, and a body 76. The first end 72 is adapted to be driven by a screwdriver, TORX® driver, or other driving tool. Second end 74 is preferably tapered for engaging the first and second expansion legs 60, 62, preferably between heel portions 73a and 73b, as shown most clearly in FIG. 6. The body 76 of the fastener 52 is preferably threaded, so that the fastener 52 may be threaded into opening 78. Other engagement mechanisms could also be used. The embodiment shown uses two fasteners 52; however, a single fastener could be used as well as any number of fasteners, and the number of fasteners used need not be as many as there are openings 78.

Figure 4:
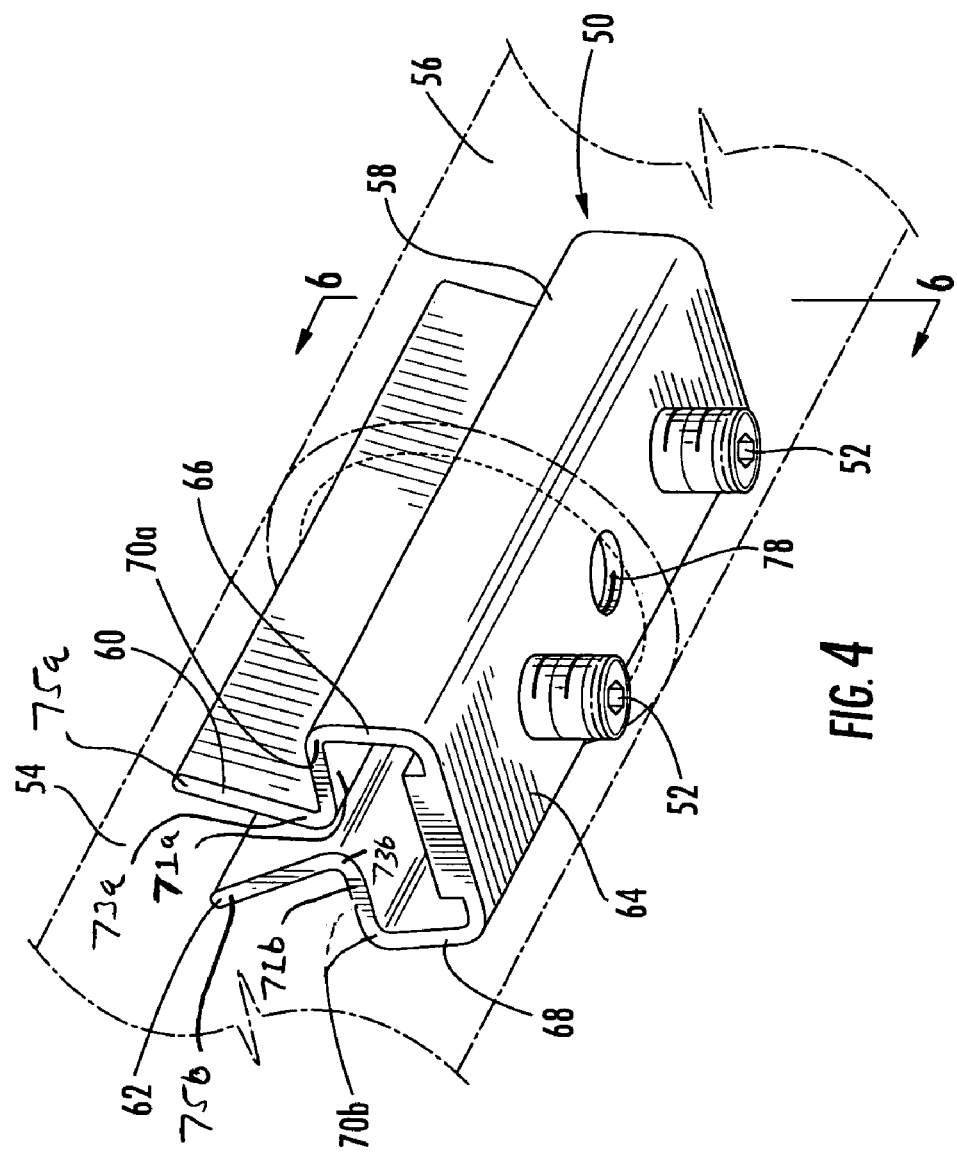
FIG. 4 is perspective view of one embodiment of the connector of the present invention, shown installed in two abutting pieces of pipe or tubing with the pipe or tubing shown in phantom.
Figure 5:
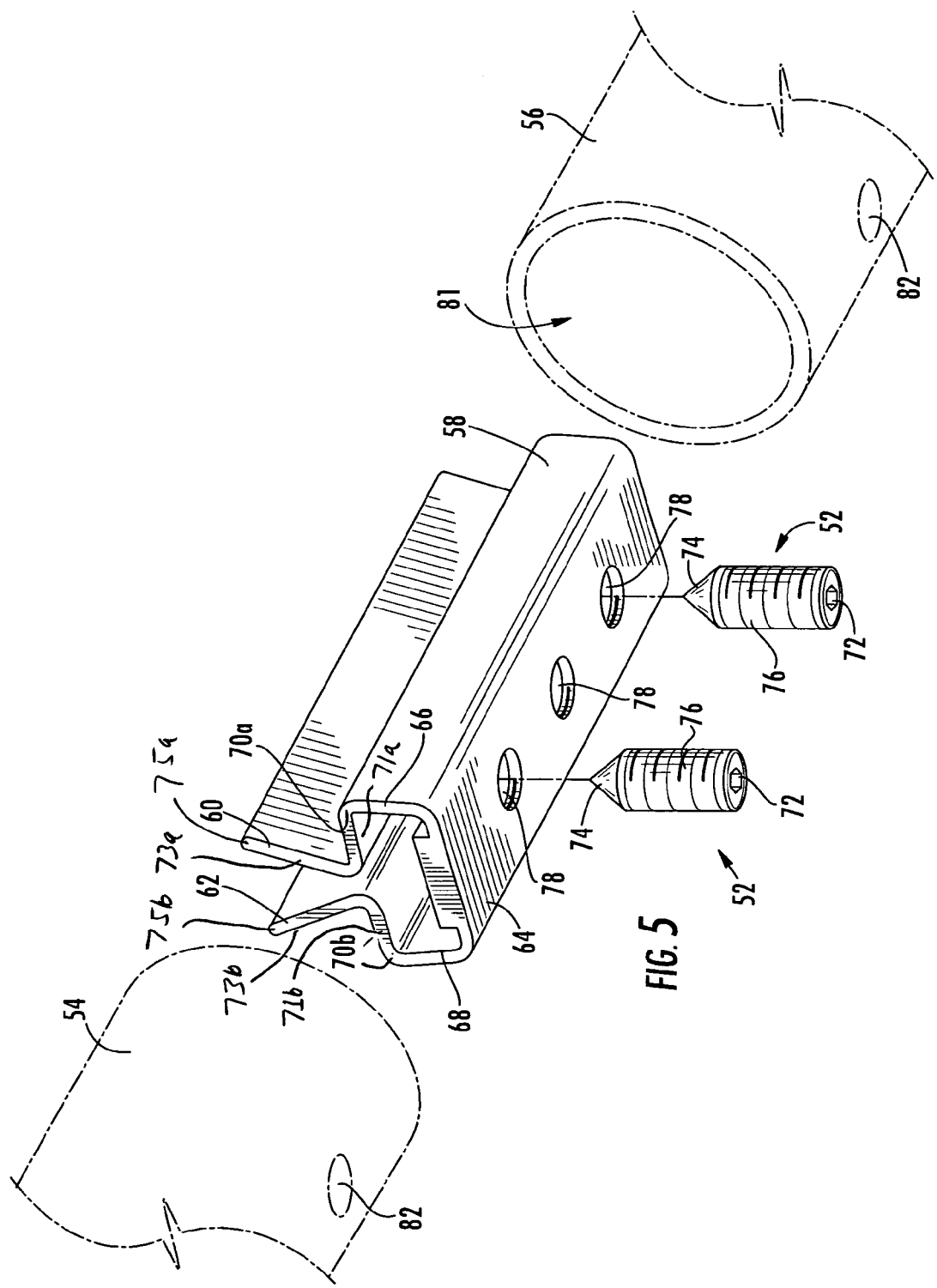
FIG. 5 is an exploded perspective view of the connector of FIG. 4.
Figure 6:
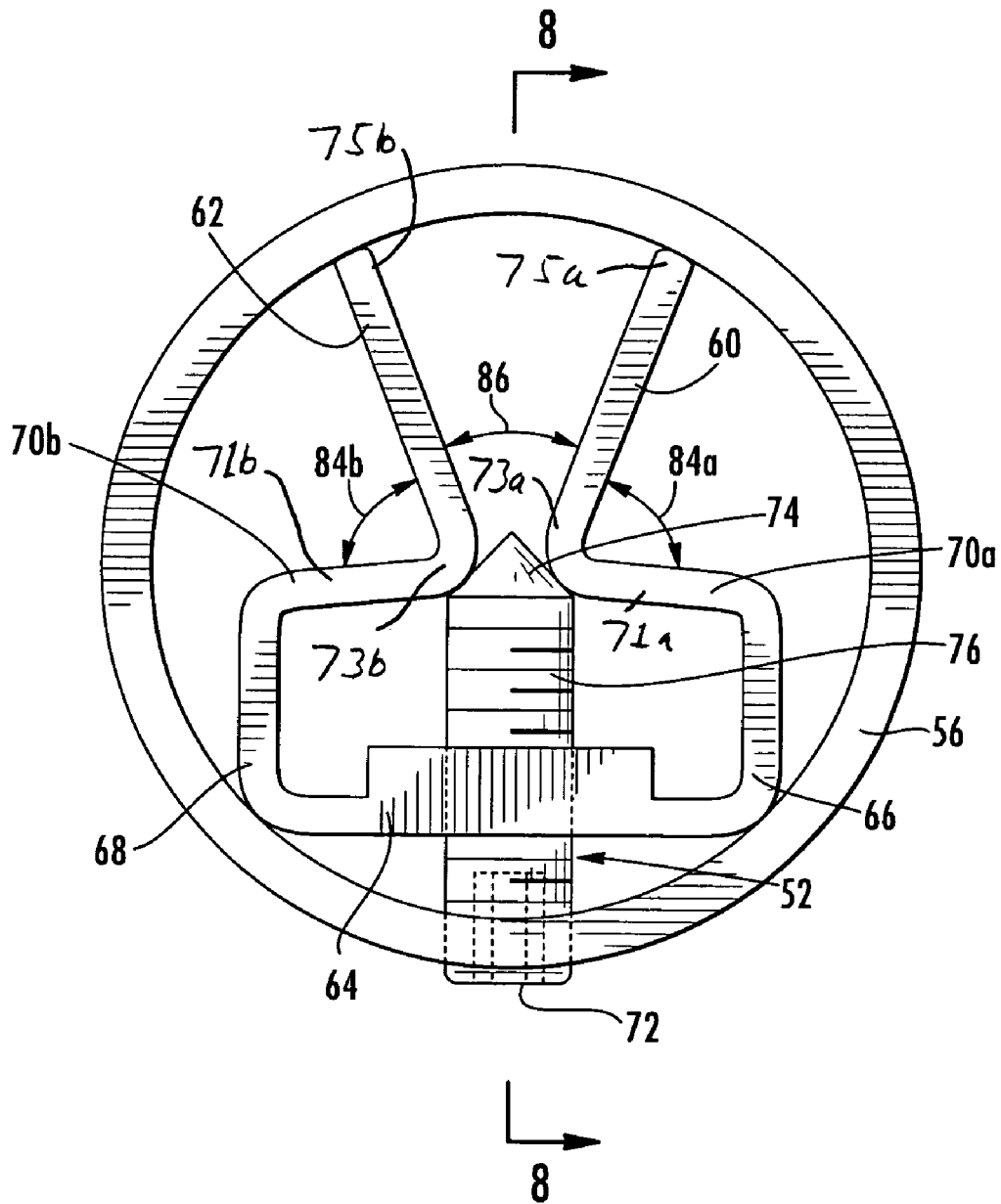
FIG. 6 is a cross-section of the connector of FIG. 4 taken along plane 6-6.
Figure 7:
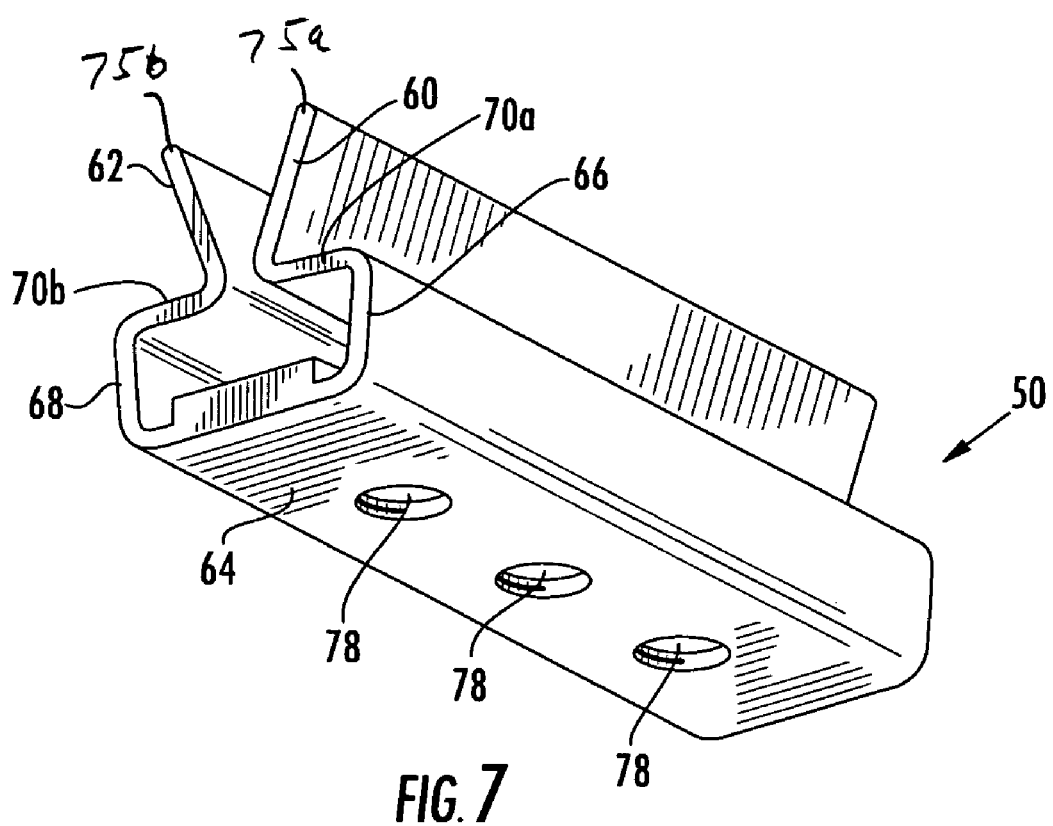
FIG. 7 is a perspective view of the connector of FIG. 4.
Figure 8:
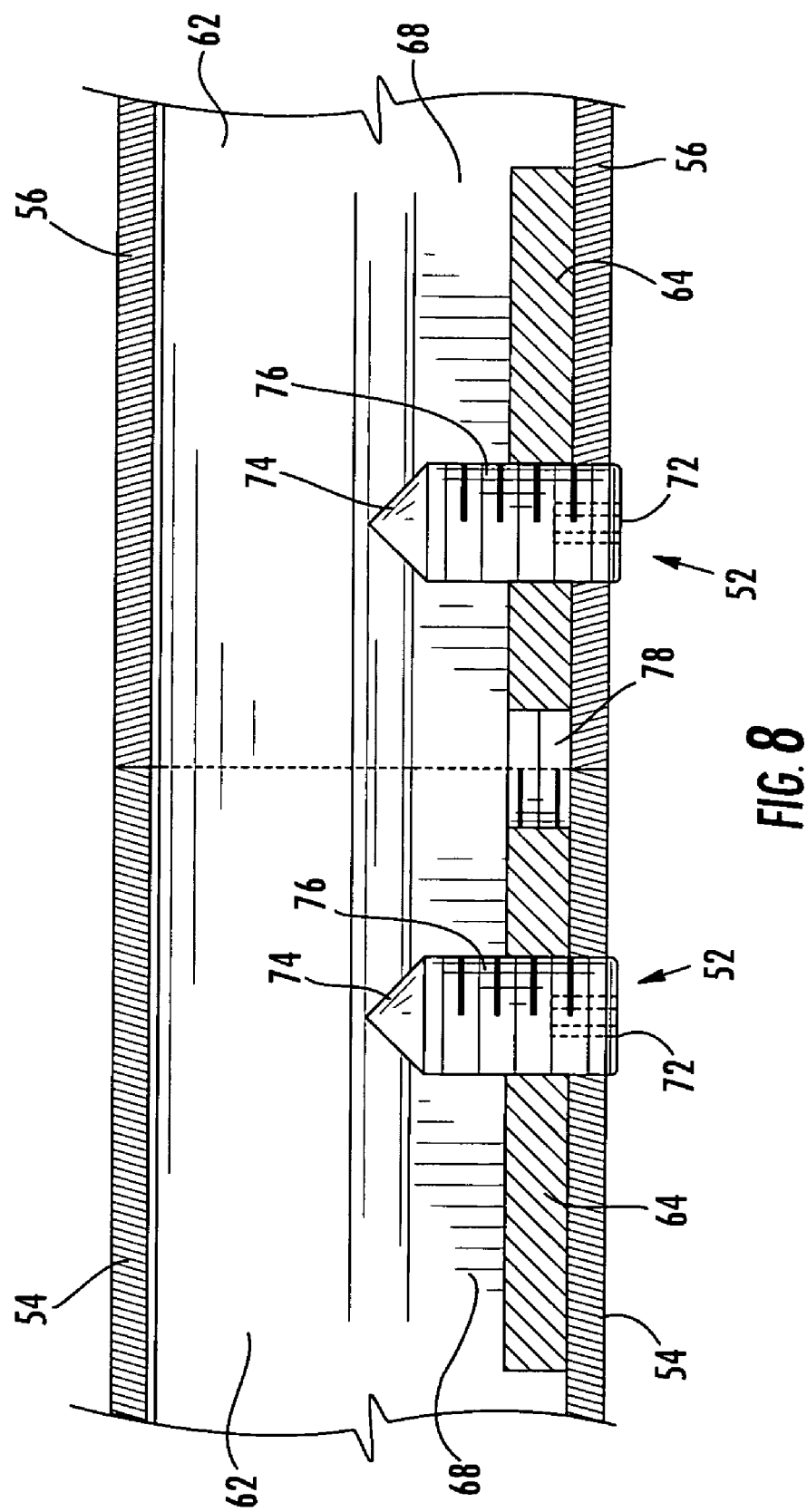
FIG. 8 is a cross-section of the connector of FIG. 4 taken along plane 8-8 of FIG. 6.

In operation, the expansion member 50 is placed in a first pipe or tubing member 54 and used to connect or splice a second pipe or tubing member 56 to the first pipe or tubing member 54. Most preferably the extrusion of the expansion member 50 is sized so as to just fit into the tubing members 54, 56 with small tolerances. FIG. 4 shows the connector of the present invention connecting and aligning two handrail pipe or tubing members, and FIG. 5 shows an exploded view of FIG. 4. The present invention could also be used to connect other types of pipe and tubing. The first and second pipe or tubing members 54, 56 each have an open end 80, 81 and at least one of the first or second pipe or tubing members 54, 56 includes an aperture 82 disposed near the open end 80, 81. The unitary expansion member 50 is placed inside the open ends 80, 81 of the two pipe or tubing members 54, 56 such that at least one opening 78 is in alignment with at least one aperture 82, and the fastener or fasteners 52 are used to secure the unitary expansion member 50 in the pipe or tubing members 54, 56. For simplicity, the use of one fastener 52 will be described in more detail, though as previously noted, multiple fasteners could be used in an analogous fashion. Fastener 52 is inserted through an aperture 82, and then threaded or otherwise engaged into one of the openings 78 until the second end 74 of the fastener 52 engages expansion legs 60, 62 as shown in FIG. 6. The engagement of the fastener 52 with the expansion legs 60, 62 causes the heel portions 73a and/or 73b to flex away from the body portion 58, causing feet 75a, 75b to move away from the body 58, until the feet contact the inside of the tubing members 54, 56, such that the, connector cannot move within the pipe or tubing members, and the pipe or tubing members cannot move with respect to each other. The connector thus securely connects the first and second pipe or tubing members 54, 56.

In one embodiment, the expansion member 50 includes only a single expansion leg 60, terminating in a single foot 75a, and the fastener 52 causes the expansion leg 60 to flex enough that the foot 75a contacts the inside of the pipe or tubing member 54, 56, thereby securing the connector within, and securing the pipe or tubing members together.

While the invention has been described with reference to preferred embodiments, those skilled in the art will appreciate that certain substitutions, alterations and omissions may be made to the embodiments without departing from the spirit of the invention. Accordingly, the foregoing description and embodiments discussed are meant to be exemplary only, and should not limit the scope of the invention.

What is claimed is:

1. A fastening assembly for connecting two hollow cylindrical handrail sections each section having a passage therethrough and a surface hole in communication with each passage, the fastening assembly comprising:

a homogenous one-piece connector having a flat rectangular body with at least two threaded bores extending perpendicularly therethrough, and two identical flat rectangular thigh portions extending from opposite sides of the body in a common direction perpendicular to the body, each thigh portion forming a rounded corner with the body portion, and two identical flat rectangular shin portions each extending perpendicularly from an end of one of the thigh portions toward one another substantially in a common plane, the shin portions forming two bent knee portions with the thigh portions, and two identical flat rectangular foot portions each extending from an end of one of the shins away from one another at an angle with respect to the shins that is greater than 45 degrees and less than 90 degrees, the foot portions forming two bent heel portions with the shins, wherein the base, thigh portions, shin portions and foot portions each have equal lengths in a common longitudinal direction;

at least two threaded fasteners threadably engaged within the threaded bores, each fastener having a frustoconical end; and wherein adjustment of the fasteners causes the frustoconical ends to bear against the heel portions and drive the rounded corners and free ends of the foot portions to bear against inner surfaces of each of the handrail sections thereby locking the handrails together in alignment in the longitudinal direction.

2. The connector of claim 1, further comprising two expansion legs, each expansion leg being formed by one of the thigh portions, one of the shin portions and one of the foot portions.

3. The connector of claim 2, wherein the body and expansion legs are integrally formed using an extrusion process.

* * * * *